United States Patent
Pfnuer

(10) Patent No.: US 9,851,509 B2
(45) Date of Patent: Dec. 26, 2017

(54) PASSIVE ALIGNMENT WITH OPTICAL FIBERS USING FERRULE MEMBER

(71) Applicant: Cisco Technology, Inc., San Jose, CA (US)

(72) Inventor: Stefan Martin Pfnuer, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 32 days.

(21) Appl. No.: 15/087,667

(22) Filed: Mar. 31, 2016

(65) Prior Publication Data

US 2017/0285270 A1 Oct. 5, 2017

(51) Int. Cl.
*G02B 6/30* (2006.01)
*G02B 6/36* (2006.01)

(52) U.S. Cl.
CPC ............. *G02B 6/30* (2013.01); *G02B 6/3652* (2013.01)

(58) Field of Classification Search
CPC ................................. G02B 6/30; G02B 6/3652
See application file for complete search history.

(56) References Cited

U.S. PATENT DOCUMENTS

| | | | | |
|---|---|---|---|---|
| 4,167,303 A | * | 9/1979 | Bowen | G02B 6/4292 385/59 |
| 4,293,180 A | * | 10/1981 | Taylor | G02B 6/3817 439/289 |
| 4,744,629 A | * | 5/1988 | Bertoglio | G02B 6/3865 174/92 |
| 5,093,881 A | * | 3/1992 | Bortolin | G02B 6/3821 385/114 |
| 5,230,030 A | * | 7/1993 | Hartman | G02B 6/4249 385/31 |
| 5,359,686 A | * | 10/1994 | Galloway | G02B 6/1221 385/37 |
| 5,422,971 A | * | 6/1995 | Honjo | G02B 6/3861 385/139 |
| 5,473,716 A | * | 12/1995 | Lebby | G02B 6/421 385/49 |

(Continued)

OTHER PUBLICATIONS

Fiberguide Industries, "White Paper: 2D Arrays," downloaded from <https://www.fiberguide.com/wp-content/uploads/2015/10/White-Paper-722-001-2D-Arrays-December-2013.pdf> on Jul. 1, 2016, 4 pages.

(Continued)

*Primary Examiner* — Peter Radkowski
(74) *Attorney, Agent, or Firm* — Patterson + Sheridan, LLP

(57) ABSTRACT

Embodiments described herein include an apparatus for passive alignment of one or more optical fibers with photonic circuitry. Generally, the apparatus includes a substrate that defines a channel configured to receive an engagement portion of a ferrule member. The apparatus further includes deformable and/or non-deformable members within the channel that form alignment faces arranged at opposite ends of the channel. The alignment faces can deform and/or limit the movement of the engagement portion of the ferrule member in order to align the optical fibers along a first dimension. A top surface of the substrate may be configured to engage with one or more lateral surfaces of the ferrule member when the engagement portion is received into the channel, thereby aligning the optical fibers along a second dimension.

20 Claims, 11 Drawing Sheets

(56) References Cited

U.S. PATENT DOCUMENTS

| | | | | | |
|---|---|---|---|---|---|
| 5,519,799 | A * | 5/1996 | Murakami | ........... | G02B 6/3825 385/66 |
| 5,692,089 | A * | 11/1997 | Sellers | ................ | G02B 6/3806 385/136 |
| 5,799,122 | A * | 8/1998 | Jeong | ................... | G02B 6/3825 385/59 |
| 5,940,562 | A * | 8/1999 | Henson | ................ | G02B 6/3885 385/88 |
| 6,045,270 | A * | 4/2000 | Weiss | ................... | G02B 6/3825 385/59 |
| 6,227,721 | B1 * | 5/2001 | Naito | ................... | G02B 6/3877 385/78 |
| 6,276,840 | B1 * | 8/2001 | Weiss | ................... | G02B 6/3825 385/59 |
| 6,318,902 | B1 * | 11/2001 | Igl | ....................... | G02B 6/3803 385/59 |
| 6,340,247 | B1 * | 1/2002 | Sakurai | ................ | G02B 6/3885 385/60 |
| 6,435,730 | B1 * | 8/2002 | Kevern | ................ | G02B 6/3869 385/60 |
| 6,459,843 | B1 * | 10/2002 | Igl | ....................... | G02B 6/3803 385/136 |
| 6,517,256 | B2 * | 2/2003 | Okamoto | ............ | G02B 6/3833 385/80 |
| 6,519,406 | B1 * | 2/2003 | Fukuyama | ........... | G02B 6/3839 385/137 |
| 6,830,382 | B1 * | 12/2004 | Deane | ................. | G02B 6/4292 385/88 |
| 7,410,303 | B2 * | 8/2008 | Sakurai | .............. | B29C 45/2628 385/78 |
| 7,512,307 | B2 * | 3/2009 | Sakurai | .............. | B29C 45/2628 385/138 |
| 9,069,144 | B2 * | 6/2015 | Bradley | ............... | G02B 6/3851 |
| 2001/0007603 | A1 * | 7/2001 | Sakurai | .............. | G02B 6/3865 385/60 |
| 2002/0176669 | A1 * | 11/2002 | Okamoto | ............ | G02B 6/3833 385/80 |
| 2003/0113089 | A1 * | 6/2003 | Lee | ...................... | G02B 6/3839 385/137 |
| 2004/0057253 | A1 * | 3/2004 | DeCusatis | ............... | G02B 6/14 362/581 |
| 2005/0123248 | A1 * | 6/2005 | Sakurai | .............. | B29C 45/2628 385/78 |
| 2006/0263034 | A1 * | 11/2006 | Sakurai | .............. | B29C 45/2628 385/147 |
| 2012/0219255 | A1 * | 8/2012 | Bradley | ............... | G02B 6/3851 385/78 |
| 2014/0193120 | A1 * | 7/2014 | Hodge | ................ | G02B 6/3893 385/79 |
| 2015/0247980 | A1 * | 9/2015 | Bradley | ............... | G02B 6/3851 29/868 |

OTHER PUBLICATIONS

Fiberguide Industries, "Fiber Optic V-Grooves & Arrays," downloaded from <http://www.fiberguide.com/wp-content/uploads/2012/08/V-Grooves_Arrays_FINAL.pdf> on Jul. 1, 2016, 4 pages.
Barwicz et al., "Automated, Self-Aligned Assembly of 12 Fibers per NanophotonicChip with Standard Microelectronics Assembly Tooling," IEEE 65th ECTC, San Diego, CA, May 26-29, 2015, 8 pages.
Cisco Technology, Inc., U.S. Appl. No. 14/930,857, filed Nov. 3, 2015, 34 pages.

* cited by examiner

PASSIVE ALIGNMENT WITH OPTICAL FIBERS USING FERRULE MEMBER

TECHNICAL FIELD

Embodiments presented in this disclosure generally relate to aligning one or more optical fibers with photonics circuitry using a ferrule member.

BACKGROUND

Alignment of certain optical components with waveguides, such as optical fibers, with a high coupling efficiency continues to be a challenge in the photonics industry. Active alignment of optical components typically requires dedicated equipment using a sub-micron resolution multi-stage axis system with integrated cameras to align the components. Moreover, an active monitoring of coupled light is often required. Not only is this equipment expensive, active alignment slows the fabrication process and limits throughput.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
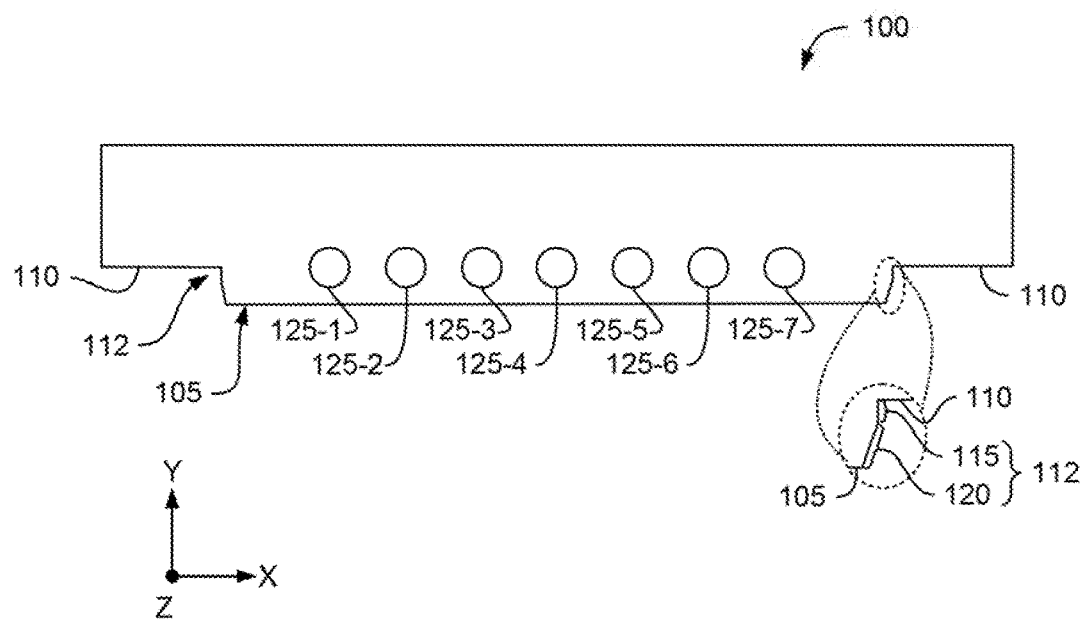
FIGS. 1A-1C illustrate an exemplary ferrule member, according to one embodiment.

One embodiment presented in this disclosure is an apparatus for passive alignment of one or more optical fibers. The apparatus comprises a substrate having a channel formed therein, the channel configured to receive an engagement portion of a ferrule member, the ferrule member defining one or more openings corresponding to the one or more optical fibers and through which the one or more optical fibers are received. The apparatus further comprises first and second deformable members extending into the channel and arranged at opposing ends of the channel. Receiving the engagement portion of the ferrule member in the channel causes the first and second deformable members to deform, thereby centering the engagement portion between the deformed first and second deformable members and thereby aligning the one or more optical fibers in a first dimension.

Another embodiment is an apparatus comprising a substrate defining a top surface, a channel, and first and second alignment faces arranged at opposing ends of the channel relative to a first dimension. The apparatus further comprises a ferrule member defining at least one opening having an optical fiber extending therethrough, the ferrule member having one or more lateral surfaces that slidingly engage with the top surface of the substrate to align the optical fiber in a second dimension when an engagement portion of the ferrule member is inserted into the channel. The engagement portion defines first and second contours at opposing ends thereof, the first and second alignment faces configured to align the ferrule member in the first dimension by engaging with the first and second contours during insertion of the engagement portion, thereby aligning the optical fiber in the first dimension.

Another embodiment is a method of making an apparatus for passive alignment of at least one optical fiber extending through an opening of a ferrule member. The method comprises forming a channel from a top surface of a substrate, the channel dimensioned to receive an engagement portion of the ferrule member, the top surface configured to engage with one or more lateral surfaces of the ferrule member when the engagement portion is received into the channel. The method further comprises forming, at opposing ends of the channel relative to a first dimension, first and second alignment faces configured to engage with first and second contours at opposing ends of the engagement portion to thereby limit motion of the ferrule member in the first dimension. The engagement of the first and second contours with the first and second alignment faces aligns the optical fiber in the first dimension, and wherein engaging the top surface with the one or more lateral surfaces aligns the optical fiber in the second dimension.

EXAMPLE EMBODIMENTS

Embodiments described herein include an apparatus for passive alignment of one or more optical fibers with photonic circuitry. Generally, the apparatus includes a substrate that defines a channel configured to receive an engagement portion of a ferrule member. The apparatus further includes deformable and/or non-deformable members within the channel that form alignment faces arranged at opposite ends of the channel. The alignment faces can deform and/or limit the movement of the engagement portion of the ferrule member in order to align the optical fibers along a first dimension. A top surface of the substrate may be configured to slidingly engage with one or more lateral surfaces of the ferrule member when the engagement portion is received into the channel, thereby aligning the optical fibers along a second dimension. One or more stop features may be included in the channel so that travel of the ferrule member is limited in a third dimension, which in turn aligns the optical fibers along the third dimension.

Figure 1B:
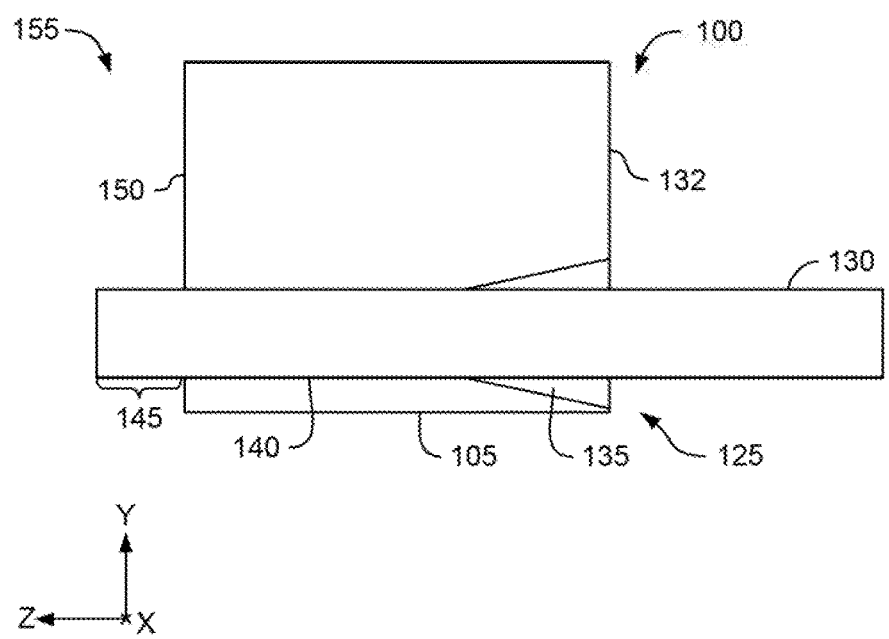
Figure 1C:
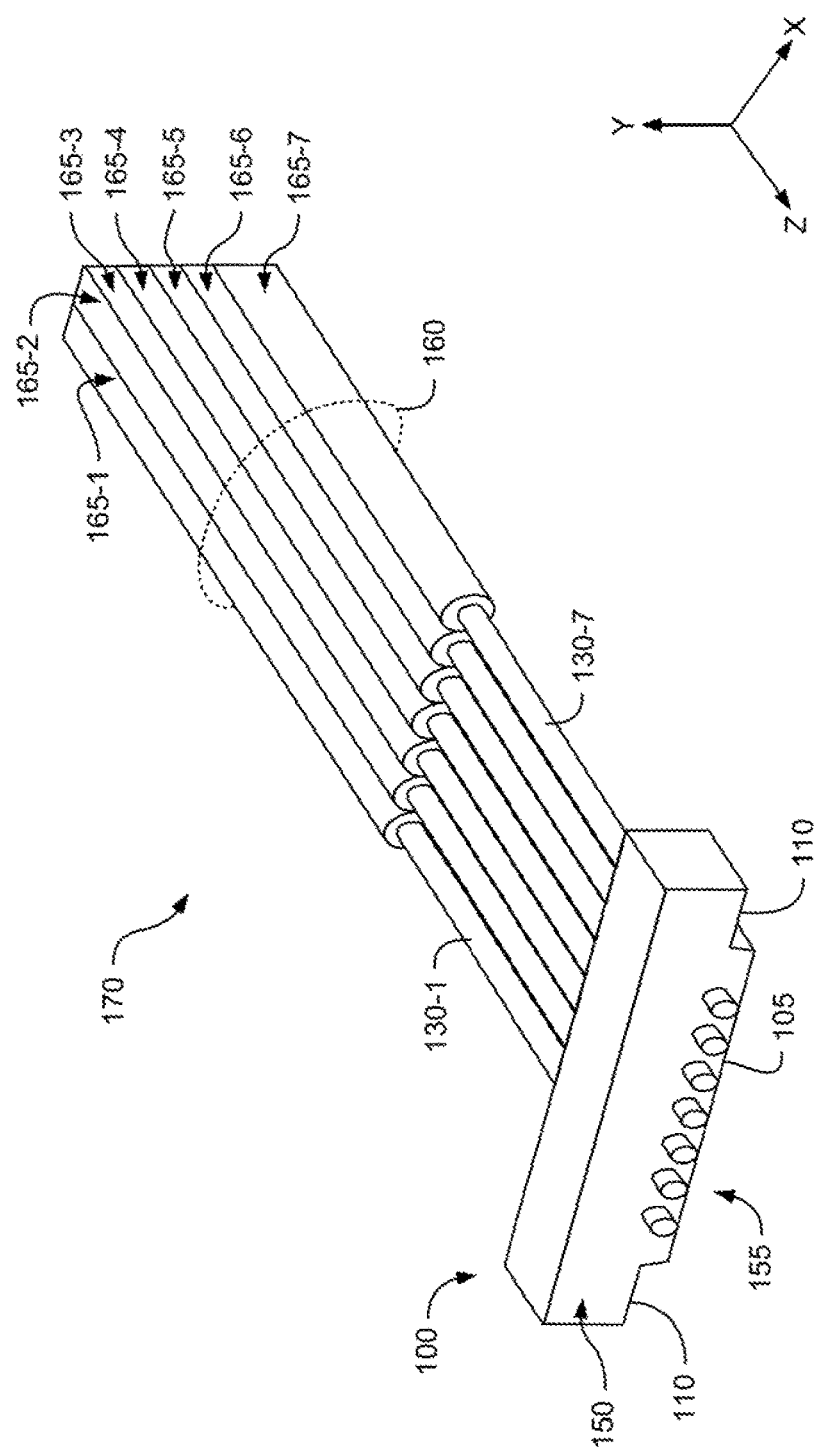

FIGS. 1A-1C illustrate an exemplary ferrule member, according to one embodiment. Note that FIGS. 1A-1C, as well as the rest of the Figures, are not drawn to scale and should not be interpreted as limiting of the possible implementations consistent with the disclosed features. In FIG. 1A, the ferrule member 100 is a singular component having one or more openings 125-1 to 125-7 (generically, openings 125) formed therethrough, each opening configured to receive an optical fiber. Although seven openings 125-1 to 125-7 are shown, other implementations may include greater or fewer numbers of openings 125. The relative position of the openings 125 generally provides a predictable spacing of the inserted optical fibers, such as a desired pitch between fibers.

The ferrule member 100 may be formed of any suitable material. In some embodiments, the ferrule member 100 is comprised of silicon or another semiconductor material. In some embodiments, the ferrule member 100 is comprised of glass. Advantageously, the choice of material for the ferrule member 100 allows precision etching techniques to define the openings 125 and other surfaces of the ferrule member, which enhances the suitability of the ferrule member 100 for passive optical alignment. For example, the openings 125 and other surfaces may be defined using deep reactive-ion etching (DRIE) or other anisotropic etching techniques. Features produced using DRIE can have accuracy to about ±1 micron, which is suitable for passive optical alignment.

The ferrule member 100 includes a bottom surface 105 as well as lateral surfaces 110 connected with the bottom surface 105 through first and second contours 112. Generally, the contours 112 and lateral surfaces 110 respectively provide "neck" and "shoulder" features that are used to align the ferrule member 100 when coupling with a substrate or other part. Each contour 112 may comprise one or more portions, each portion having a particular orientation. As shown, each contour 112 includes a first portion 115 and second portion 120. The first portion 115 may be substantially orthogonal to the lateral surface 110. As shown, the first portion 115 provides a vertical interface (assuming that lateral surface 110 is oriented horizontally along the X-dimension). The second portion 120 is disposed between the first portion 115 and the bottom surface 105. The second portion 120 may be a chamfered edge, having an interface angled relative to the first portion 115.

In some embodiments, when coupling the ferrule member 100 with a corresponding substrate (or other part) to align the inserted optical fibers relative to the substrate, the first portion 115 couples with rigid alignment features of the substrate and/or the second portion 120 couples with deformable alignment features of the substrate. For example, the angle of the second portion 120 relative to the first portion 115 may be selected based on a desired deformation angle for deformable alignment features of the substrate. In some embodiments, the ferrule member 100 couples with one of rigid and deformable alignment features. In other embodiments, the ferrule member 100 couples with both rigid and deformable alignment features during coupling with the substrate. For example, and as will be discussed further below, the ferrule member 100 may be given an initial coarse alignment at a first stage having rigid alignment features, and may be given a subsequent precision alignment at a second stage having deformable alignment features.

FIG. 1B provides a cross-section view of an assembly 155 comprising one or more optical fibers 130 inserted into one or more openings 125 of the ferrule member 100. Each optical fiber 130 (or fiber 130) is part of a larger optical cable assembly 165-1 to 165-7 (see FIG. 1C; generically optical cable 165) comprising a number of different layers for suitable propagation of optical signals. In some embodiments, the optical cable 165 includes a center core, cladding material, buffer coating, and an insulating jacket. As used here, the optical fiber 130 refers to the combination of the center core and cladding material portions. Generally, the diameter of the optical fiber 130 for a single mode fiber may range between about 100 microns to 200 microns.

The opening 125 extending through the ferrule member 100 includes a chamfered portion 135 at a first endface 132, and a precision portion 140 at a second endface 150. As the fiber 130 is inserted in the positive Z-direction, the cross-sectional area of the chamfered portion 135 gradually narrows to that of the precision portion 140. The precision portion 140 may have a consistent cross-sectional area. Thus, using chamfered portion 135 as a lead-in stage provides a gradual alignment of the fiber 130 within the opening 125. While shown as extending to a certain depth in the Z-dimension from the first endface 132, the chamfered portion 135 may have any suitable alternate depth. In one embodiment, the chamfered portion 135 extends substantially from the first endface 132 to the second endface 150 (i.e., requiring no separate precision portion 140).

After the insertion of the fiber 130 through the opening 125, which in some cases is a tool-assisted process, the fiber 130 protrudes from the second endface 150. The protrusion length 145 can be controlled so that the inserted fiber 130 will have a desired distance from optical elements when the ferrule member 100 is inserted in the substrate. For example, the inserted fibers 130 may be secured within the ferrule member 100 using an epoxy or other suitable adhesive, and the inserted fibers 130 may be laser cleaved to each have a same protrusion length 145. Other techniques for controlling protrusion length 145 are possible. For example, in another embodiment, the protruding fiber 130 may be mechanically polished flat with the endface 150 resulting in no protrusion length 145.

FIG. 1C illustrates a subassembly 170 comprising a bundle 160 of optical cables 165-1 to 165-7 coupled with the ferrule member 100. The optical cables 165 may have their insulating jackets and buffer coatings stripped off to expose the optical fibers 130-1 to 130-7. Each optical fiber 130-1 to 130-7 is inserted through a corresponding opening of the ferrule member 100, providing the optical fibers 130 with desired spacing at the second endface 150 of the ferrule member 100.

Figure 2A:
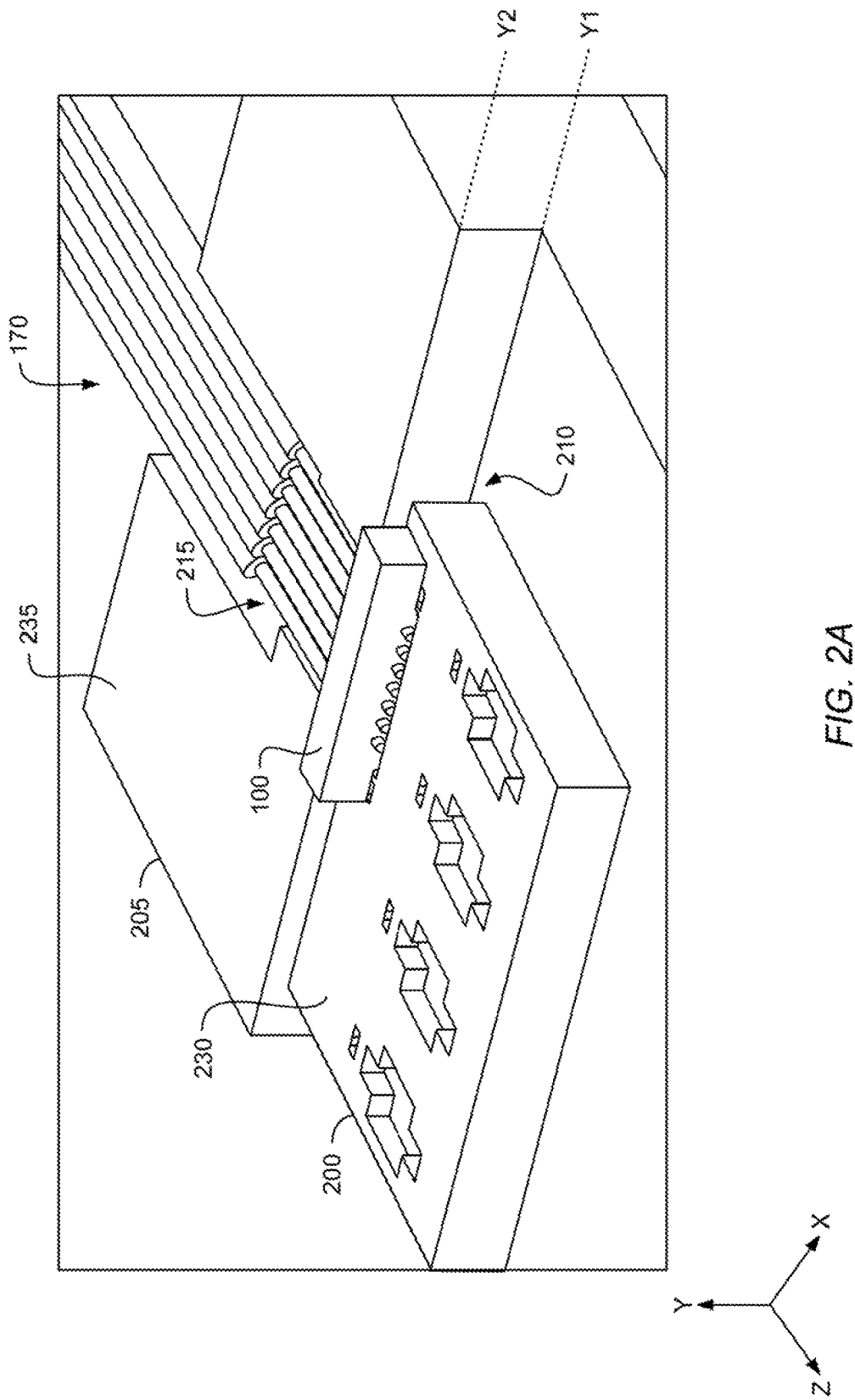
FIGS. 2A and 2B illustrate passive alignment of optical fibers with photonics circuitry using a ferrule member, according to one embodiment.
Figure 2B:
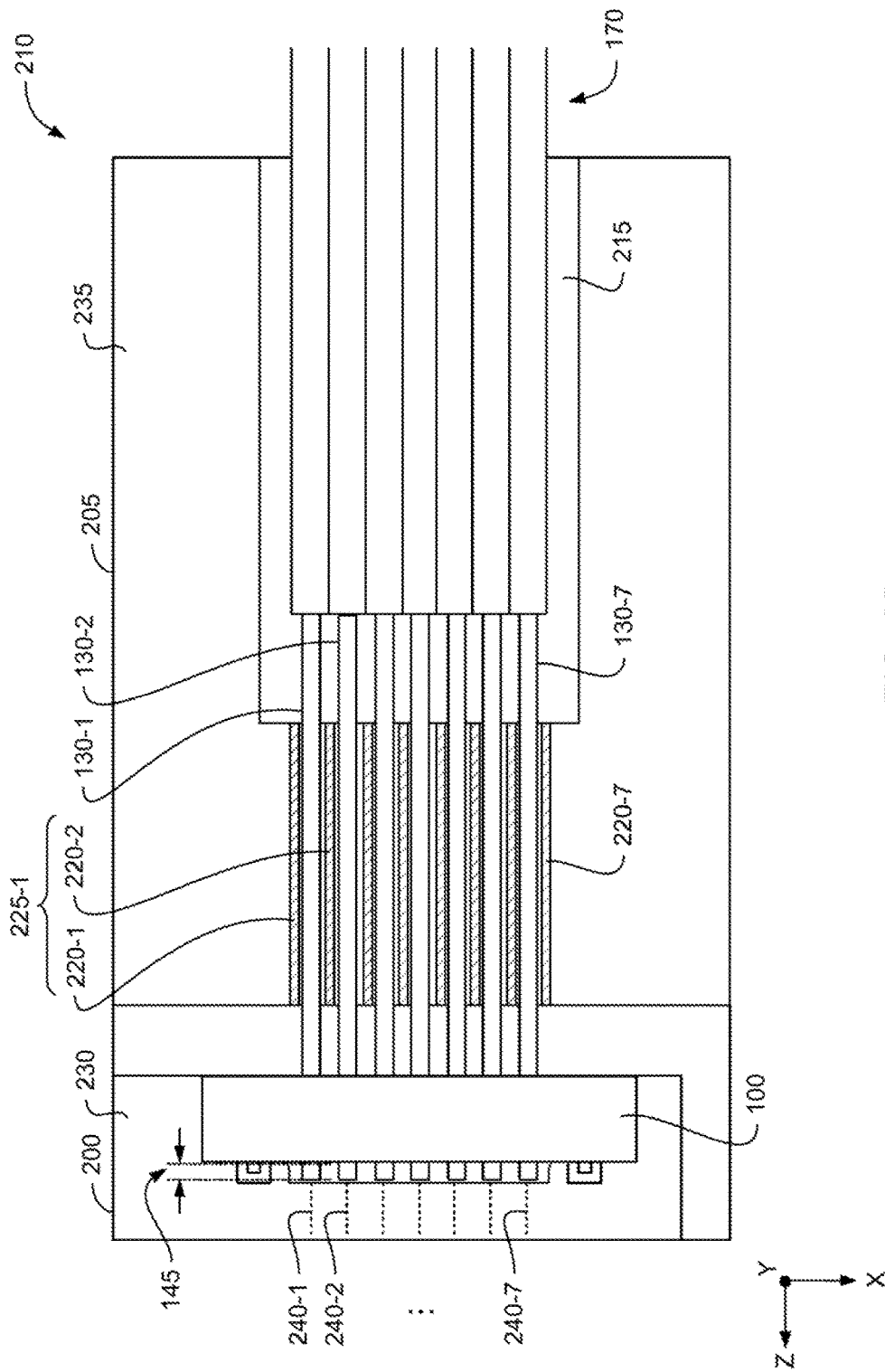

FIGS. 2A and 2B depict an assembly 210 comprising the subassembly 170' coupled with a photonics chip 200 (also referred to as a substrate 200). A mounting platform 205 is coupled with the photonics chip 200 and with the subassembly 170. The photonics chip 200 and mounting platform 205 may be formed of the same material as the ferrule member 100, such as silicon, and each may have features defined using precise etching techniques, such as DRIE. In this way, the photonics chip 200 can provide features in the X, Y, and/or Z-dimensions as mechanical reference planes for inserting the ferrule member 100 that are accurate to about ±1 micron. In another embodiment, to reduce cost the material of mounting platform 205 may be an iron-based metal (e.g., steel) or a copper-based metal having suitable thermal expansion properties. Some non-limiting examples include Kovar™, Alloy 42, and copper molybdenum (CuMo).

The mounting platform 205 includes a top surface 235 at a height Y2 in the Y-dimension. The photonics chip 200 is coupled with the mounting platform at another surface at height Y1<Y2. A cavity 215 is formed in the mounting platform 205 relative to the top surface 235. Within the cavity 215, a plurality of ridges 220-1, 220-2, . . . (generically, ridges 220) are formed with an orientation along a length of the optical fibers 130 (i.e., in the Z-dimension). Each pair of adjacent ridges 220 forms a groove 225-1 (generically, groove 225) within which an optical fiber 130-1 may be placed. The grooves 225 provide stress relief for the bundle of optical cables. In some embodiments, an epoxy or other suitable adhesive is applied to adhere the optical fibers 130 within the grooves 225.

The photonics chip 200 includes a plurality of optical waveguides 240-1, 240-2, . . . , 240-7 (generically, waveguide 240). As shown, the waveguides 240 are located below a top surface 230 of the substrate 200 (i.e., in the negative Y-direction). Waveguides 240 and/or other optical elements may be disposed at any suitable location beneath, at, or above the top surface 230, so long as their positioning relative to the optical fibers 130 can be well controlled. When the ferrule member 100 of the assembly 170 is inserted into a cavity formed in the substrate 200, features disposed in the cavity control the positioning of the ferrule member 100 in the X, Y, and/or Z-dimensions such that the optical fibers 130 align with the waveguides 240.

Figure 3:
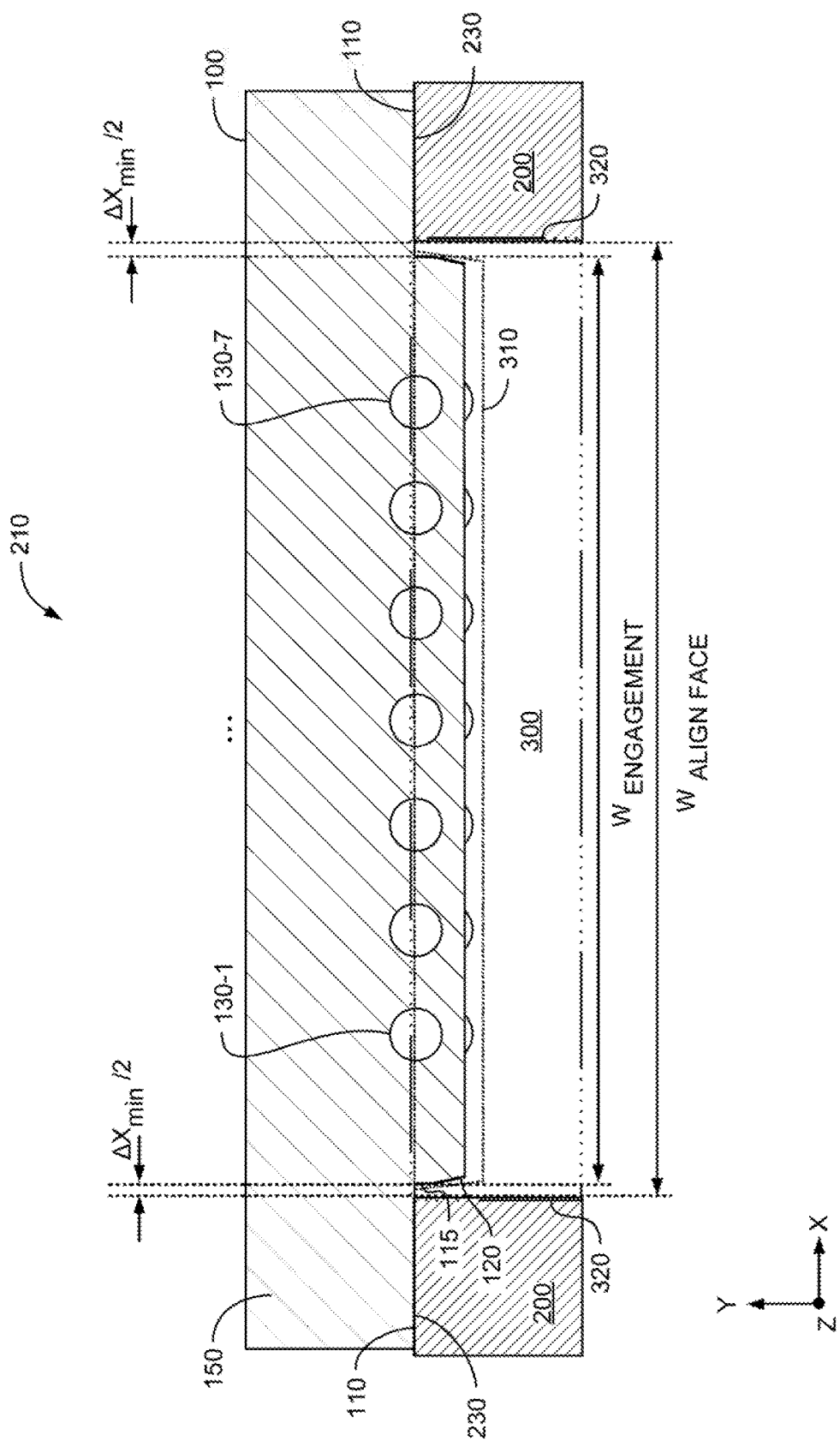
FIG. 3 illustrates passive alignment of optical fibers using rigid alignment features, according to one embodiment.

FIG. 3 illustrates passive alignment of optical fibers using rigid alignment features, according to one embodiment. In FIG. 3, a portion of substrate 200 is shown defining a channel 300 configured to receive an engagement portion 310 of the ferrule member 100. The engagement portion 310 generally includes the first portion 115 and second portion 120 of contours 112, as well as the bottom surface of the ferrule member 100. When the engagement portion 310 is inserted into the channel 300, the lateral surfaces 110 of the ferrule member 100 slidingly engage with the top surface 230 of the substrate 200. This engagement or registration of the surfaces controls a height of the optical fibers 130 in the Y-dimension.

The substrate 200 includes rigid alignment features that are configured to limit the movement of the ferrule member 100 in the X-dimension by engaging with the first potion 115 and/or second portion 120 of contours 112 during insertion. For example, the portions of substrate 200 shown may be considered non-deformable members, meaning that force applied by the ferrule member 100 on the substrate 200 during insertion causes no deflection (or at most negligible deflection) of the non-deformable members. The non-deformable quality is generally based on material properties and geometries of the ferrule member 100 and substrate 200, as well as any external force applied (such as using a tool assisting with the insertion of engagement portion 310).

The substrate 200 forms first and second alignment faces 320 configured to engage with the engagement portion 310. As shown, the first and second alignment faces have a vertical orientation (i.e., oriented along the Y-dimension), but other orientations are possible. The width between the first and second alignment faces 320 (i.e., $w_{align\ face}$) should be large enough to accommodate the width of the engagement portion 310 (i.e., $w_{engagement}$) under all conditions, but as small as possible to effectively limit the travel of the ferrule member 100 in the X-dimension and thereby maintain a suitable alignment with the optical fibers 130. As shown, $w_{engagement}$ extends between the first (vertical) portions 115 of the contours 112.

As discussed above, manufacturing using DRIE processes result in typical tolerances of about ±1 micron. Under a maximum material condition, both the ferrule member 100 and substrate 200 have the largest amount of material consistent with the process tolerances. As a result, at a maximum material condition with the example tolerances, the width of engagement portion 310 is increased to ($w_{engagement}$+1 micron), and the width between the alignment faces 320 is decreased to ($w_{align\ face}$−1 micron). Further, in many cases a minimum gap ($\Delta x_{min}$) is provided for the manufacturing process to ensure the engagement portion 310 can mate with substrate 200 under less-than-optimal conditions, e.g., in the presence of dust or debris, or where the engagement portion 310 has a small angular rotation relative to the channel 300. Because the engagement portion 310 is shown as centered in the channel 300 along the X-dimension, the minimum gap $\Delta x_{min}$ is represented as $\Delta x_{min}/2$ between each alignment face 320 and each first portion 115.

A worst-case misalignment of the optical fibers 130 can occur when both the ferrule member 100 and substrate 200 have the smallest amount of material consistent with the process tolerances. Here, the worst-case misalignment may occur when the width of engagement portion 310 is ($w_{engagement}$−1 micron) and the width between the alignment faces 320 is ($w_{align}$+1 micron). Assuming that a minimum gap $\Delta x_{min}$ of 1 micron is needed at the maximum material condition, the worst case misalignment is approximately 3 microns, which can correspond to a substantial reduction in optical power between the optical fibers 130 and other optical components.

In one embodiment, when using rigid alignment features such as substrate 200, the worst-case misalignment of the optical fibers 130 can be reduced by applying a force in the X-dimension during the insertion of the engagement portion 310 into the channel 300. For example, by consistently applying a force in the negative X-direction (as shown, to the left), the engagement portion 310 will physically contact the first alignment face 320 and reduce the variability of positioning within the channel 300. Although it is possible that reducing the worst-case misalignment would not guarantee a suitable optical alignment of the optical fibers 130 in all cases, reducing the worst-case misalignment tends to increase the probability of achieving a suitable optical alignment during production, generally increasing throughput and reducing costs.

Figure 4:
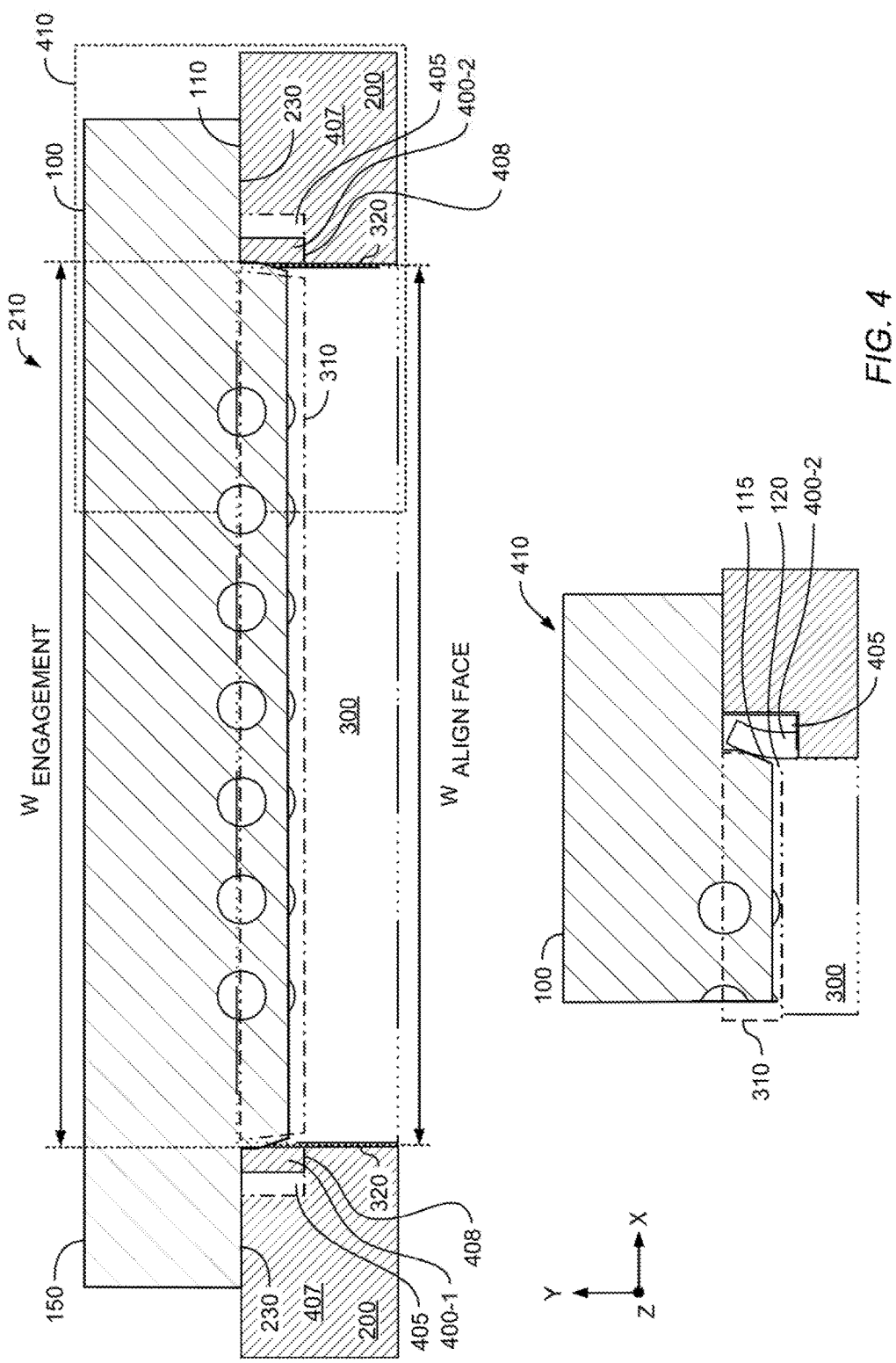
FIG. 4 illustrates passive alignment of optical fibers using deformable alignment features, according to one embodiment.

FIG. 4 illustrates passive alignment of optical fibers using deformable alignment features, according to one embodiment. In FIG. 4, a portion of the substrate 200 is shown defining a channel 300 configured to receive an engagement portion 310 of the ferrule member 100. In this case, the width between the first and second alignment faces 320 (i.e., $w_{align\ face}$) is slightly smaller than the width of the engagement portion 310 (i.e., $w_{engagement}$). Generally, the engagement portion 310 is received in the channel by deforming deformable members 400-1, 400-2 (generically, deformable members 400).

In this case, substrate 200 defines deformable members 400-1, 400-2 arranged at opposing ends of the channel 300 and extending into the channel 300. During insertion of the engagement portion 310, the deformable members 400-1, 400-2 deform laterally outward—deformable member 400-1 deflects in the negative X-direction and deformable member 400-2 deflects in the positive X-direction. The magnified view 410 illustrates the deflection of deformable member 400-2. As shown, the deformable members 400 are deformed into respective cavities 405 formed between each deformable member 400 and a body portion 407 of the substrate 200. Generally, the body portion 407 represents a portion of the substrate 200 that is dimensioned to include and/or to couple with other optical components and circuitry.

Body portion 407 may be non-deformable and relatively thick compared to the deformable members 400, but this is not a requirement. When deformed by the insertion of the engagement portion 310, the deformable members 400 engage with the second portion 120. In this way, the angle of the second portion 120 relative to the first portion 115 may be selected to control the amount of deformation to reduce wear and/or avoid damaging the deformable members 400.

The force applied by the deformable members 400 on the engagement portion 310 causes the engagement portion 310 to be aligned therebetween. For example, if the deformable members 400-1, 400-2 are manufactured with substantially the same material properties and dimensions, each deformable member 400 exerts a substantially equal amount of force on the engagement portion 310. With equal force applied, the deformable members 400 may substantially center (in X-dimension) the engagement portion 310 between them. As a result, the worst-case misalignment of the optical fibers 130 can be advantageously reduced to less than 1 micron.

In some embodiments, the deformable members 400 are formed of the same material as substrate 200, but different have a different geometry allowing deformation. Some non-limiting examples of materials used for deformable members 400 include silicon and indium phosphide. An example, non-limiting range of suitable Young's modulus (E) values for the material is about 130 gigapascals (GPa) to 188 GPa, or an average value of about 150 GPa. A suitable range of thickness of deformable members 400 depends on an aspect ratio and thus a depth of etching into the substrate 200. For a relatively deep etch (e.g., about 450 microns) a suitable thickness range may be about 100 microns to about 400 microns. For a shallower etch (e.g., about 200 microns) a suitable thickness range may be about 60 microns to about 400 microns.

As shown, a cavity 405 may be etched between each deformable member 400 and the body portion 407 of the substrate 200, providing the deformable members 400 with a suitable width (X-dimension) for deflecting. Although the deformable members 400 are shown as having the same Y-dimension height as the body portion 407 (i.e., to a top surface 230), other implementations may provide the deformable members 400 with different height. Further, the deformable members 400 may have any other suitable dimensions such as a different profile in any dimension(s).

In alternate embodiments, the deformable members 400 may comprise different material(s) than the substrate 200, e.g., material(s) having a different stiffness or rigidity. For example, the material(s) may be deposited onto a portion of the substrate 200 and extend into the channel 300. In another example, the deformable members 400 may begin with the same material as the substrate 200, but are treated or otherwise conditioned to have different physical properties.

In alternate embodiments, the deformable members 400 may deform differently than as shown. For example, a first end of the deformable member 400-1 (in the negative Y-direction) is shown as attached with the body portion 407 at an interface 408, and a second end (in the positive Y-direction) of the deformable member 400-1 is configured to deflect in the negative X-direction. In another embodiment, the deformable member 400-1 is detached from the body portion 407 at the interface 408, and attached to the body portion 407 and/or a non-deformable member elsewhere, such as in the negative Z-direction (not shown). In this case, both the first end and second end of deformable member 400 may deflect in the negative X-direction when the engagement portion 310 is inserted into channel 300.

In another alternate embodiment, one of the alignment features extending into the channel 300 is deformable, while the alignment feature on the opposing side of the channel 300 (not shown) is relatively stiffer or non-deformable. In this case, the non-deformable alignment feature would provide a known reference surface, and forces exerted by the deformable alignment feature and the non-deformable alignment feature on the engagement portion 310 would not need to be balanced in order to suitably align the fibers 130.

Figure 5A:
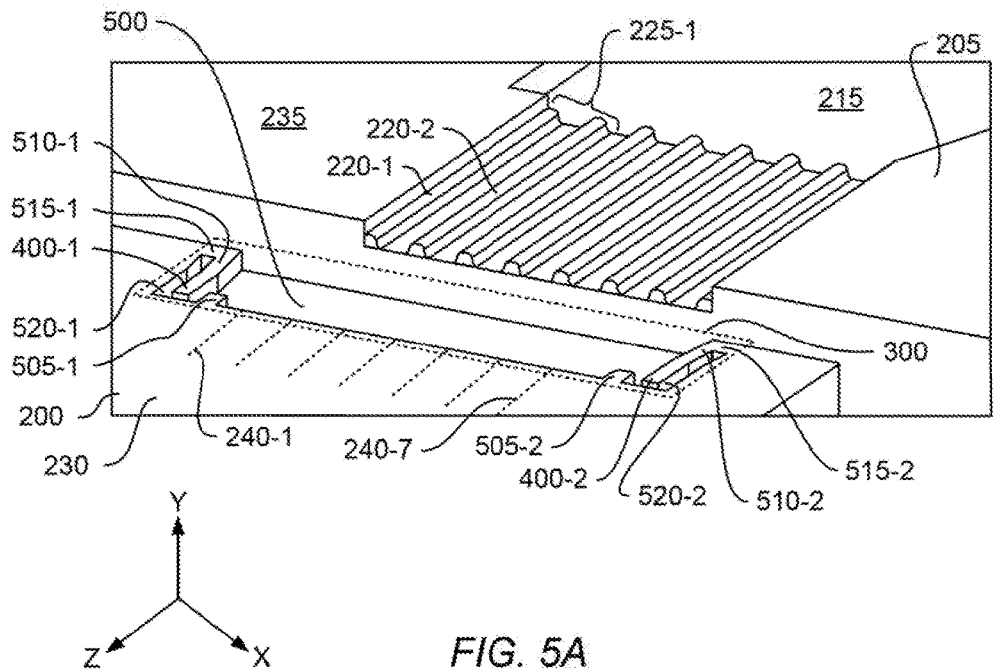
FIGS. 5A and 5B illustrate a substrate having a channel formed therein, according to one embodiment.
Figure 5B:
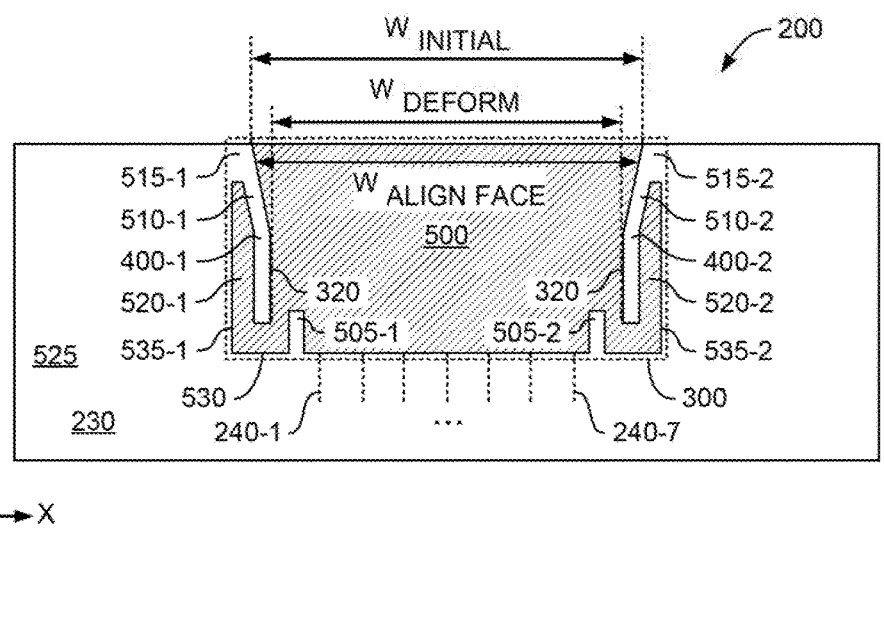

FIGS. 5A and 5B illustrate a substrate having a channel formed therein, according to one embodiment. More specifically, FIGS. 5A and 5B illustrate the use of both non-deformable members and deformable members for passively aligning optical fibers using a ferrule member inserted into the channel.

The extent of channel 300 in the X-Z plane is indicated by the dashed line. Channel 300 defines a bottom surface 500, which may be uniform and substantially parallel to the top surface 230 of substrate 200. Stop features 505-1, 505-2 extend into the channel 300 from a rear surface 530 and/or the bottom surface 500 of the substrate 200. The stop features 505-1, 505-2 are configured to engage with an endface or other portion of a ferrule member to limit travel of the ferrule member in the positive Z-direction when the engagement portion is received in the channel 300. Thus, engaging the stop features 505-1, 505-2 with the ferrule member aligns the optical fibers in the Z-dimension. Additionally, in combination with the protrusion length(s) of the optical fibers, engaging the stop features 505-1, 505-2 controls a distance between the optical fibers and other optical elements such as waveguides 240, providing a desired optical coupling therebetween.

Non-deformable members 510-1, 510-2 (generically, non-deformable members 510) are arranged at opposing ends of the channel 300 and extend into the channel 300 from the bottom surface 500. The non-deformable members 510-1, 510-2 may be connected with a body portion 525 of the substrate 200 through respective bridge members 515-1, 515-2 (generically, bridge members 515) extending into the channel 300. The non-deformable members 510 and bridge members 515 may generally be formed of the same material as substrate 200, deformable members 400, and/or stop features 505-1, 505-2. For example, the non-deformable members 510, bridge members 515, deformable members 400, and stop features 505-1, 505-2 may be formed by removing a portion of substrate 200 using DRIE or other suitably accurate techniques.

In one embodiment, a deformable member 400, a non-deformable member 510, and/or a bridge member 515 may be formed as a singular, continuous feature within the channel 300 having varying properties along a length of the feature. Each portion of the feature can have different geometries and/or materials to provide the distinguishing properties. For example, the deformable member 400-1 and non-deformable member 510-1 are shown as having a similar material width within the channel 300, but the non-deformable member 510-1 has greater lateral stability (in the X-direction) than the deformable member 400 due at least in part to its connection with bridge member 515-1.

In some embodiments, a non-deformable member 510 and deformable member 400 form a continuous alignment face 320 configured to align the ferrule member during insertion of the engagement portion in the channel 300. When the engagement portion is inserted into the channel in the positive Z-direction, the non-deformable members 510 correspond to a first stage of alignment providing an initial "rough" alignment of the ferrule member 100. The width across the channel 300 between first and second alignment faces 320 (i.e., $w_{align\ face}$) tapers gradually with the width across the channel 300 between non-deformable members 510 (i.e., $w_{nondeform}$) from an initial width (i.e., $w_{initial}$) to a width between the deformable members 400 (i.e., $w_{deform}$). As insertion continues further in the positive Z-direction, the deformable members 400 correspond to a second stage of alignment providing a subsequent "precise" alignment of the ferrule member. As discussed above, $w_{deform}$ is generally smaller than a width of the engagement portion of the ferrule member, causing the deformable members 400 to deflect laterally outward. The insertion continues in the positive Z-direction until the ferrule member contacts the stop features 505-1, 505-2, at which time the optical fibers extending through the ferrule member may be aligned in the X, Y, and Z dimensions for a suitable optical connection with the waveguides 240 or other optical components included on or within the substrate 200.

FIGS. 6A-6D illustrate passive alignment of an optical fiber using an exemplary ferrule member, according to one embodiment. While FIGS. 1A-5B have generally depicted ferrule members configured to receive a plurality of optical fibers that are included in optical cables having a substantial length, alternate implementations of ferrule members may connect with shorter optical fiber stubs using similar principles.

Figure 6A:
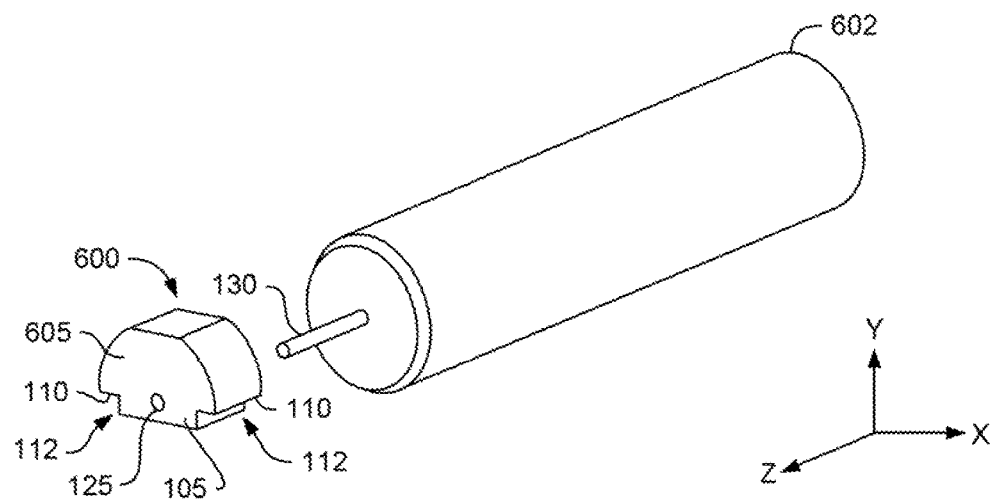
FIGS. 6A-6D illustrate passive alignment of an optical fiber using an exemplary ferrule member, according to one embodiment.
Figure 6B:
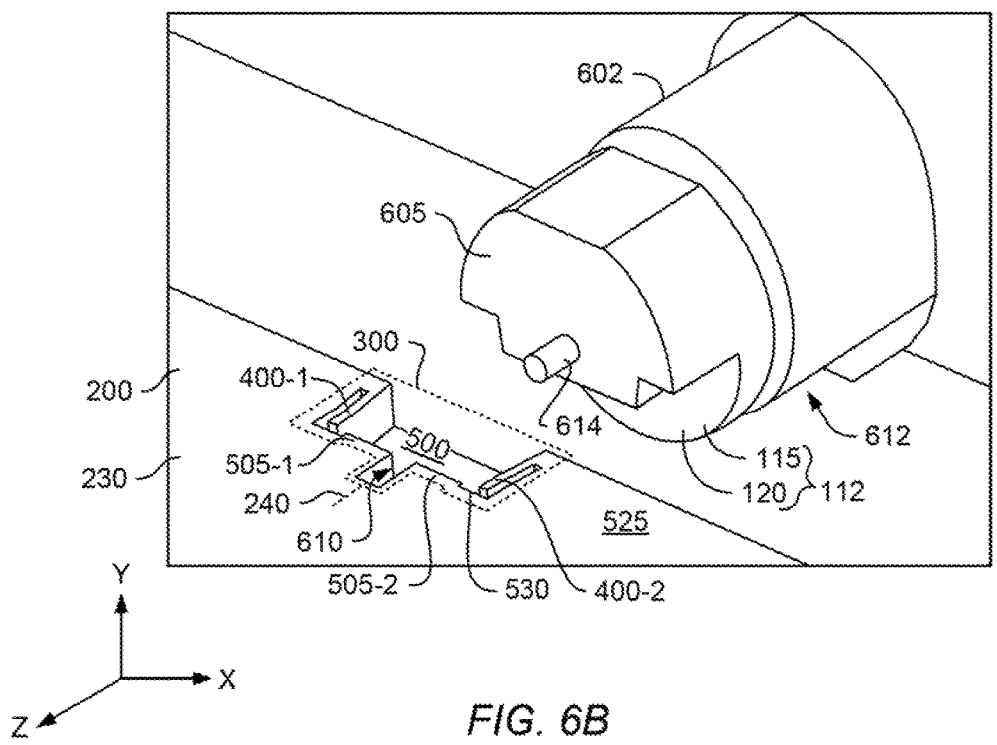

In FIGS. 6A and 6B, the ferrule member 600 is configured to receive an optical fiber 130 through an opening 125 extending through the ferrule member 600. The opening 125 may include a chamfered lead-in portion, as shown in greater detail in FIG. 1A above. The optical fiber 130 may be part of a relatively short optical fiber stub 602 configured to interface with other elements outside of the substrate. The connection of the ferrule member 600 with the optical fiber 130 forms an assembly 612. The components of assembly 612 may be fixed using an epoxy or suitable alternate adhesive. When connected within assembly 612, the optical fiber 130 protrudes some distance from an endface 605 of the ferrule member 600, and the protruding portion 614 may be trimmed (e.g., laser cleaved) to a desired length. The channel 300 may have an extended portion 610 extending past the rear surface 530 that is configured to accommodate the protruding portion 614 when an engagement portion of the ferrule member 600 is inserted into the channel. A waveguide 240 or other optical element may be aligned with the extended portion 610.

Figure 6C:
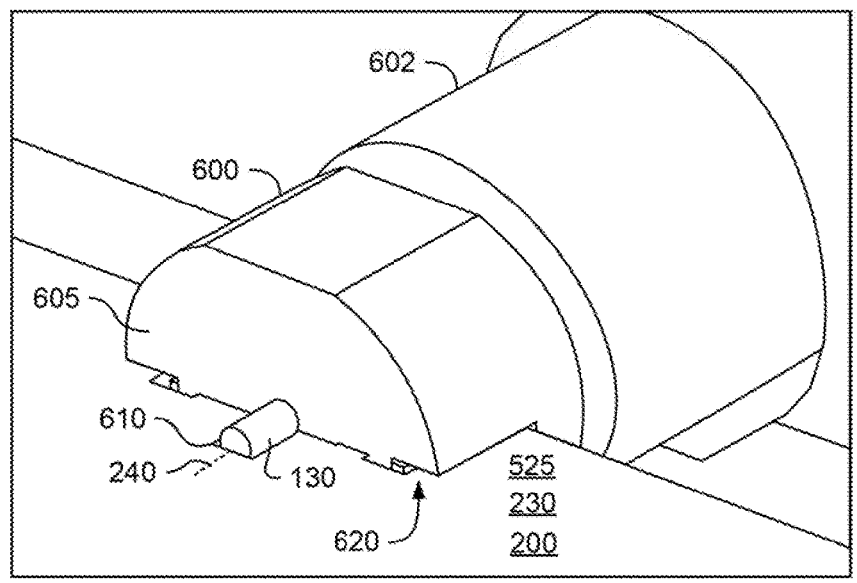
Figure 6D:
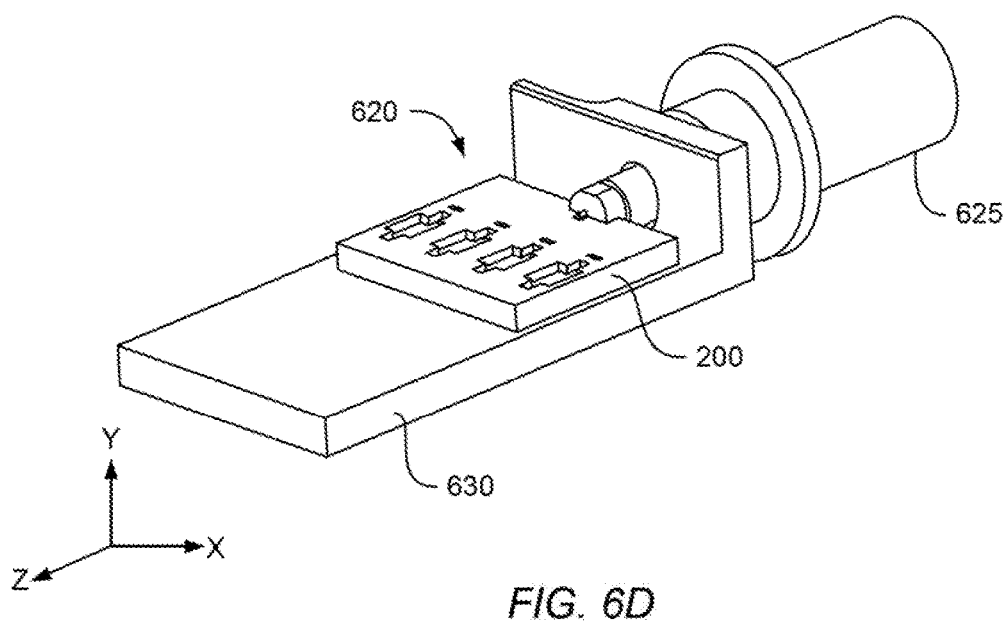

FIG. 6C illustrates the assembly 620 comprising the connection of assembly 612 with the substrate 200. FIG. 6D illustrates the assembly 620 included on a mounting plate 630, where the optical fiber stub 602 is connected with an optical fiber connector 625. The optical fiber connector 625 may have any suitable type, e.g., proprietary types or standardized types such as Lucent Connector (LC), Subscriber Connector (SC), Ferrule Connector (FC), and so forth.

Figure 7:
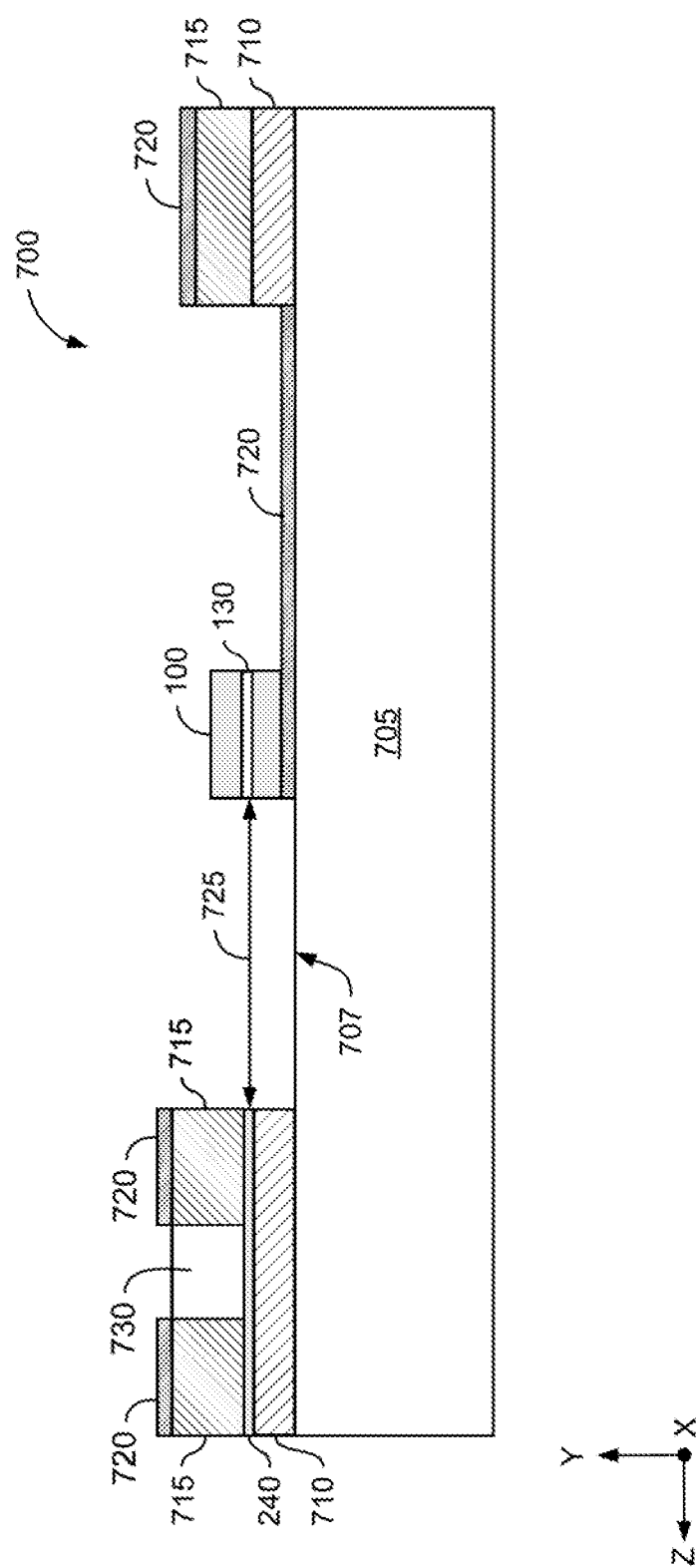
FIG. 7 illustrates an exemplary arrangement of a ferrule member in a silicon-on-insulator (SOI)-based photonics platform, according to one embodiment.

FIG. 7 illustrates an exemplary arrangement of a ferrule member in a silicon-on-insulator (SOI)-based photonics platform, according to one embodiment. More specifically, FIG. 7 is a cross-sectional view of an arrangement 700. Arrangement 700 includes a silicon substrate 705 having multiple layers formed upon a surface 707 thereof. The layers may include a buried oxide (BOX) layer 710, a silicon waveguide 240, interlayer dielectric (ILD) layer 715, and a silicon dioxide layer 720, though different layers and numbers of layers are possible. The depth or thickness of each of these layers in the Y-dimension may generally be well-controlled to within tens or hundreds of nanometers using known growth, deposit, and/or removal processes or techniques. The arrangement 700 may include a portion 730 of the ILD layer 715 within which circuitry is included. The circuitry may remain exposed, e.g., including conductive bonding pads to connect with other circuitry (e.g., integrated circuits or other optical components).

For layers whose thicknesses are generally well-controlled within tens or hundreds of nanometers, those layers may be suitable as mechanical references well within a target of 1 micron or less. For example, the Y-dimension depth of the surface 707 of the silicon substrate 705 may be relatively precisely controlled using various techniques such as DRIE, and therefore may be suitable for engaging with ferrule member 100 to control a height thereof. Lateral surfaces (e.g., the lateral surfaces 110 discussed above) of the ferrule member 100 may engage with the surface 707 of the silicon substrate 705 to align the optical fiber 130 in the Y-dimension for an optical coupling 725 with waveguide 240. Additionally, in some embodiments, the height of other layers may be precisely controlled and therefore similarly suitable for engaging with the ferrule member 110. As shown, the silicon dioxide layer 720 formed upon the silicon substrate 705 may also be used to engage the ferrule member 100 and align the optical fiber 130 with the waveguide 240. Other non-limiting examples include metallic layers deposited onto the silicon substrate 705 or silicon dioxide layer 720.

Figure 8:
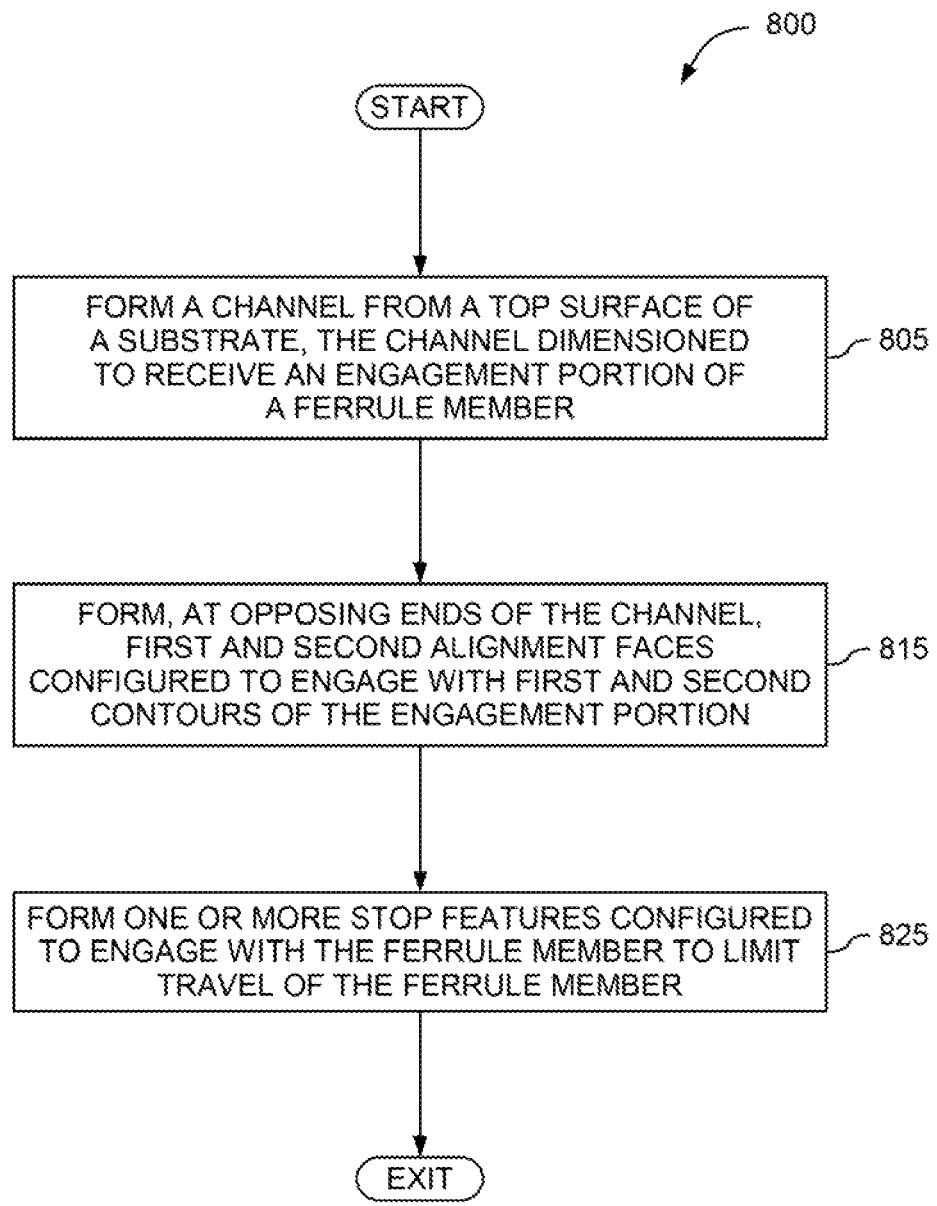
FIG. 8 is a flowchart illustrating a method of making an apparatus for passive alignment of an optical fiber, according to one embodiment.

FIG. 8 is a flowchart illustrating a method 800 of making an apparatus for passive alignment of an optical fiber, according to one embodiment. Method 800 is generally intended to be complemented using features of various embodiments discussed above.

Method 800 begins at block 805, where a channel is formed from a top surface of a substrate. The channel is dimensioned to receive an engagement portion of a ferrule member. The top surface of the substrate is configured to engage with one or more lateral surfaces of the ferrule member when the engagement portion is received into the channel. The channel may be formed using any suitably precise techniques, such as DRIE.

At block 815, first and second alignment faces are formed at opposing ends of the channel relative to a first dimension. The first and second alignment faces generally extend into the channel. The first and second alignment faces are configured to engage with first and second contours at opposing ends of the engagement portion to thereby limit motion of the ferrule member in the first dimension. In some embodiments, the selective engagement of the first and second contours with the first and second alignment faces aligns the one or more optical fibers in the first dimension, and engaging the top surface with the one or more lateral surfaces of the ferrule member aligns the one or more optical fibers in a second dimension. In some embodiments, forming the first and second alignment faces comprises forming first and second deformable members extending into the channel, where the first and second deformable members have a spacing along the first dimension that is less than a width of the engagement portion.

At block 825, one or more stop features are formed that are configured to engage with the ferrule member to limit travel of the ferrule member when the engagement portion is received in the channel. The one or more stop features generally extend into the channel. Engaging the ferrule member with the one or more stop features may align the one or more optical fibers in a third dimension. Method 800 ends following completion of block 825. However, consistent with other embodiments described herein, the method 800 may include formation of additional features, such as non-deformable members, bridge members, and so forth. Further, in some embodiments the formation processes described in blocks 805, 815, and 825 may be performed using a singular etching process such as DRIE. For example, a substrate may have a mask material applied to the top surface to define the channel as well as features extending into the channel, such as the deformable members and stop features.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. An apparatus for passive alignment of one or more optical fibers, the apparatus comprising:
    a substrate having a channel formed therein, the channel configured to receive an engagement portion of a ferrule member, the ferrule member defining one or more openings corresponding to the one or more optical fibers and through which the one or more optical fibers are received; and
    first and second deformable members extending into the channel and arranged at opposing ends of the channel along a first dimension,
    wherein receiving the engagement portion of the ferrule member in the channel causes the first and second deformable members to deform, thereby centering the engagement portion between the deformed first and second deformable members and thereby aligning the one or more optical fibers in the first dimension.

2. The apparatus of claim 1, wherein the channel defines a bottom surface, and wherein the first and second deformable members extend into the channel from the bottom surface.

3. The apparatus of claim 1, wherein the substrate includes one or more optical waveguides formed therein, wherein the one or more optical fibers, when inserted into the aligned one or more openings, are aligned with the one or more optical waveguides along the first dimension.

4. The apparatus of claim 1, wherein the substrate defines a top surface, wherein the ferrule member further defines one or more lateral surfaces that engage with the top surface of the substrate when the engagement portion of the ferrule member is received in the channel, thereby aligning the one or more openings in a second dimension.

5. The apparatus of claim 4, further comprising one or more stop features extending into the channel, the one or more stop features arranged to limit travel of the ferrule member when the engagement portion is received in the channel, thereby aligning the one or more optical fibers in a third dimension.

6. The apparatus of claim 1, further comprising first and second non-deformable members extending into the channel and arranged at the opposing ends of the channel, the first and second non-deformable members providing an initial alignment of the ferrule member when receiving the engagement portion of the ferrule member in the channel, wherein deforming the first and second deformable members provides a subsequent alignment of the ferrule member.

7. The apparatus of claim 6, wherein a width between the first and second non-deformable members in the first dimension reduces from an initial width to a tapered width as the engagement portion of the ferrule member is received into the channel in a second dimension.

8. The apparatus of claim 7, wherein the tapered width between the first and second non-deformable members is at least the width of the engagement portion of the ferrule member.

9. The apparatus of claim 6, wherein the engagement portion of the ferrule member defines first and second contours, each contour having respective first and second portions, wherein the first portions are configured to engage with the first and second non-deformable members, and wherein the second portions are configured to engage with the first and second deformable members.

10. The apparatus of claim 1, wherein the substrate comprises a body portion having the channel formed therein, wherein each of the first and second deformable members deforms laterally outward along the first dimension into a respective cavity formed within the channel between each of the first and second deformable members and the body portion.

11. The apparatus of claim 1, wherein the first and second deformable members are monolithically formed from the substrate.

12. An apparatus, comprising:
    a substrate defining a top surface, a channel, and first and second alignment faces arranged at opposing ends of the channel relative to a first dimension, wherein the first and second alignment faces include first and second deformable members extending into the channel and arranged at opposing ends of the channel relative to the first dimension; and
    a ferrule member defining at least one opening having an optical fiber extending therethrough,
    the ferrule member having one or more lateral surfaces that slidingly engage with the top surface of the substrate to align the optical fiber in a second dimension when an engagement portion of the ferrule member is inserted into the channel, the engagement portion defining first and second contours at opposing ends thereof, the first and second alignment faces configured to align the ferrule member in the first dimension by deforming to engage the first and second contours during insertion of the engagement portion, thereby aligning the optical fiber in the first dimension.

13. The apparatus of claim 12, wherein the first and second alignment faces further include first and second non-deformable members extending into the channel and arranged at the opposing ends of the channel relative to the first dimension, wherein the first and second non-deformable members provide an initial alignment of the ferrule member when the engagement portion is inserted in the channel, wherein deforming the first and second deformable members provides a subsequent alignment of the ferrule member.

14. The apparatus of claim 12, wherein the substrate further defines one or more stop features arranged to limit travel of the ferrule member when the engagement portion is received in the channel, thereby aligning the optical fiber in a third dimension.

15. The apparatus of claim 12, wherein the substrate includes at least one optical waveguide formed therein, wherein the optical fiber is aligned with the optical waveguide in the first and second dimensions.

16. The apparatus of claim 12, wherein inserting the engagement portion into the channel comprises applying a force in the first dimension to cause one of the first and second contours to consistently engage with the corresponding one of the first and second alignment faces.

17. A method of making an apparatus for passive alignment of at least one optical fiber extending through an opening of a ferrule member, the method comprising:

forming a channel from a top surface of a substrate, the channel dimensioned to receive an engagement portion of the ferrule member, the top surface configured to engage with one or more lateral surfaces of the ferrule member when the engagement portion is received into the channel; and forming, at opposing ends of the channel relative to a first dimension, first and second alignment faces configured to engage with first and second contours at opposing ends of the engagement portion to thereby limit motion of the ferrule member in the first dimension, wherein the engagement of the first and second contours with the first and second alignment faces aligns the optical fiber in the first dimension, and wherein engaging the top surface with the one or more lateral surfaces aligns the optical fiber in the second dimension.

18. The method of claim 17, wherein forming the first and second alignment faces comprises forming first and second deformable members extending into the channel, the first and second deformable members having a spacing along the first dimension less than a width of the engagement portion.

19. The apparatus of claim 1, wherein the one or more optical fibers comprises a plurality of optical fibers, wherein the one or more openings comprise a plurality of openings providing a predetermined pitch between individual optical fibers of the plurality of optical fibers along the first dimension.

20. The apparatus of claim 12, wherein the first and second deformable members are monolithically formed from the substrate.

* * * * *